US00RE41649E

(19) United States
(12) Reissued Patent
Popat

(10) Patent Number: US RE41,649 E
(45) Date of Reissued Patent: Sep. 7, 2010

(54) LASER OR INK JET PRINTABLE BUSINESS CARD SYSTEM

(75) Inventor: Ghanshyam H. Popat, Richcrest, CA (US)

(73) Assignee: Avery Dennison Corporation, Pasadena, CA (US)

(21) Appl. No.: 11/847,259

(22) Filed: Aug. 29, 2007

Related U.S. Patent Documents

Reissue of:
(64) Patent No.: 5,853,837
Issued: Dec. 29, 1998
Appl. No.: 08/764,713
Filed: Dec. 10, 1996

U.S. Applications:
(62) Division of application No. 08/641,332, filed on Apr. 30, 1996, now Pat. No. 5,997,680.

(51) Int. Cl.
*B32B 3/00* (2006.01)

(52) U.S. Cl. ..... 428/43; 428/77; 428/131; 428/136; 428/137; 428/138; 283/105

(58) Field of Classification Search ..... 428/43, 428/77, 131, 136, 137, 138; 283/105
See application file for complete search history.

(56) References Cited

U.S. PATENT DOCUMENTS 3,140,215 A 7/1964 Russell
3,267,780 A * 8/1966 Roth ..... 83/880

(Continued)

FOREIGN PATENT DOCUMENTS

| | | | |
|---|---|---|---|
| DE | 4240825 | | 6/1994 |
| DE | 4240825 | A1 * | 6/1994 |
| DE | 1996-19519584 | | 12/1996 |
| DE | 19741563 | | 3/1998 |
| DE | 29805481 | | 9/1998 |
| DE | 29907361 | | 3/2000 |
| DE | 19945254 | | 8/2001 |
| DE | 69909841 | | 5/2004 |
| EP | 0377289 | * | 12/1989 |
| EP | 0688006 | A1 * | 3/1995 |
| EP | 0987670 | | 3/2000 |
| EP | 2000-0987195 | | 3/2000 |
| WO | WO 88/07737 | * | 10/1988 |
| WO | WO 94/20944 | * | 9/1994 |
| WO | WO-1995-034879 | | 12/1995 |
| WO | WO-2000-016978 | | 3/2000 |
| WO | WO-2000-032412 | | 6/2000 |

OTHER PUBLICATIONS

Information Disclosure Statement filed Jun. 16, 2005 in Application Ser. No. 90/007,592, 2 pp.
Patent for which reexamination is requested filed Jun. 16, 2005 in Application Ser. No. 90/007,592, 6 pp.

(Continued)

*Primary Examiner*—Alexander Thomas
(74) *Attorney, Agent, or Firm*—Douglas N. Larson; Intellectual Property Law Office of Joel Voelzke, APC

(57) ABSTRACT

Two pairs of parallel substantial-cut [or scored] lines extend the length of a card stock sheet and short through-cut lines extend between each of the pairs to define two columns of business card blanks on the sheet. The sheet is passed through a laser or ink jet printer, printing the desired identifying or other indicia on the blanks. The blanks are then separated along the substantial-cut and through-cut lines and the waste sheet portions at the ends, sides, and between the columns are disposed of. The business cards separate cleanly along the substantial-cut lines, superior to the microperforated business card separation lines. Even with the substantial-cut and full-cut lines, the card stock sheets have enough integrity to reliably pass through the printer without breaking apart.

138 Claims, 2 Drawing Sheets

U.S. PATENT DOCUMENTS

| | | | | | |
|---|---|---|---|---|---|
| 3,269,278 | A | | 8/1966 | Olstad | |
| 3,288,006 | A | * | 11/1966 | Erlandson | 83/879 |
| 3,338,199 | A | * | 8/1967 | Talyor | 413/13 |
| 3,790,744 | A | * | 2/1974 | Bowen | 219/121.69 |
| 3,896,246 | A | | 7/1975 | Brady, Jr. | |
| 4,005,810 | A | | 2/1977 | Porter | |
| 4,048,736 | A | | 9/1977 | Castleman et al. | |
| 4,173,293 | A | | 11/1979 | Hamisch, Jr. et al. | |
| 4,176,572 | A | * | 12/1979 | Pennington | 83/862 |
| 4,380,564 | A | | 4/1983 | Cancio et al. | |
| 4,428,857 | A | | 1/1984 | Taylor et al. | |
| 4,457,199 | A | * | 7/1984 | Corcoran | 83/862 |
| 4,465,729 | A | | 8/1984 | Cancio et al. | |
| 4,494,435 | A | * | 1/1985 | Lindsay | 83/880 |
| 4,524,894 | A | * | 6/1985 | Leblond | 225/2 |
| 4,732,069 | A | | 3/1988 | Wood et al. | |
| 4,833,122 | A | | 5/1989 | Doll et al. | |
| 4,863,772 | A | | 9/1989 | Cross | |
| 4,979,612 | A | * | 12/1990 | Melbye | 206/216 |
| 5,031,939 | A | | 7/1991 | Webendorfer et al. | |
| 5,132,915 | A | * | 7/1992 | Goodman | 700/233 |
| 5,135,789 | A | | 8/1992 | Schmidt | |
| 5,160,573 | A | * | 11/1992 | Takagi et al. | 156/510 |
| 5,178,419 | A | | 1/1993 | Bolnick et al. | |
| 5,198,275 | A | * | 3/1993 | Klein | 428/43 |
| 5,220,858 | A | * | 6/1993 | Allen et al. | 83/880 |
| 5,238,269 | A | * | 8/1993 | Levine | 281/2 |
| 5,318,325 | A | | 6/1994 | Ipsen | |
| 5,340,427 | A | | 8/1994 | Cusack et al. | |
| 5,366,250 | A | | 11/1994 | Sunabe | |
| 5,389,414 | A | | 2/1995 | Popat | |
| 5,398,580 | A | * | 3/1995 | Gerhardt et al. | 83/880 |
| 5,413,532 | A | | 5/1995 | Raby | |
| 5,462,488 | A | | 10/1995 | McKillip | |
| 5,487,568 | A | | 1/1996 | Ipsen | |
| 5,560,966 | A | | 10/1996 | Kishimoto et al. | |
| 5,571,587 | A | * | 11/1996 | Bishop et al. | 428/43 |
| 5,632,842 | A | | 5/1997 | Oliver et al. | |
| 5,702,789 | A | | 12/1997 | Fernandez-Kirchberger et al. | |
| 5,709,913 | A | | 1/1998 | Andersen et al. | |
| 5,727,817 | A | | 3/1998 | Kraige | |
| 5,735,453 | A | | 4/1998 | Gick et al. | |
| 5,811,371 | A | | 9/1998 | Egashira et al. | |
| 5,947,368 | A | | 9/1999 | Thresher et al. | |
| 5,993,928 | A | | 11/1999 | Popat | |
| 5,997,680 | A | | 12/1999 | Popat | |
| 6,162,517 | A | | 12/2000 | Oshima et al. | |
| 6,173,649 | B1 | | 1/2001 | Onishi | |
| 6,380,132 | B1 | | 4/2002 | Mihara et al. | |
| 2001/0003609 | A1 | | 6/2001 | Takada et al. | |

OTHER PUBLICATIONS

Request for Ex Parte Reexamination by Third party filed Jun. 16, 2005 in Application Ser. No. 90/007,592, 19 pp.

Information Disclosure Statement filed Nov. 18, 2005 in Application Ser. No. 90/007,592, 5pp.

Supplemental Information Disclosure Statement filed Nov. 30, 2005 in Application Ser. No. 90/007,592, 4 pp.

Supplemental Information Disclosure Statement filed Dec. 1, 2005 in Application Ser. No. 90/007,592, 5 pp.

Supplemental Information Disclosure Statement filed Jan. 18, 2006 in Application Ser. No. 90/007,592, 4 pp.

Office Action dated Mar. 1, 2006 in Application Ser. No. 90/007,592, 31 pp.

Supplemental Information Disclosure Statement filed Mar. 8, 2006 in Application Ser. No. 90/007,592, 4 pp.

Supplemental Information Disclosure Statement filed Mar. 21, 2006 in Application Ser. No. 90/007,592, 4 pp.

Ex Parte Reexamination Examiner Interview Summary Record filed May 9, 2006 in Application Ser. No. 90/007, 592, 5 pp.

Supplemental Information Disclosure Statement filed May 16, 2005 in Application Ser. No. 90/007,592, 3 pp.

Office Action in Ex Parte Reexamination dated Jan. 25, 2007 in Application Ser. No. 90/007,592, 40 pp.

Ex Parte Reexamination Examiner Interview Summary filed Mar. 21, 2007 in Application Ser. No. 90/007,592, 17 pp.

Interview Summary Record filed Mar. 26, 2007 in Application Ser. No. 90/007,592, 3 pp.

Ex Parte Reexamination Certificate issued Jan. 8, 2008 in Application Ser. No. 90/007,592, 7 pp.

Request for Ex Parte Reexamination by Third Party filed Jun. 16, 2005 in Application Ser. No. 90/007,591, 14 pp.

Information Disclosure Statement filed Nov. 18, 2005 in Application Ser. No. 90/007,591, 5 pp.

Supplemental Information Disclosure Statement filed Nov. 30, 2005 in Application Ser. No. 90/007,591, 5 pp.

Supplemental Information Disclosure Statement filed Nov. 30, 2005 in Application Ser. No. 90/007,591, 4 pp.

Supplemental Information Disclosure Statement filed Dec. 1, 2005 in Application Ser. No. 90/007,591, 4 pp.

Supplemental Information Disclosure Statement filed Dec. 1, 2005 in Application Ser. No. 90/007,591, 5 pp.

Supplemental Information Disclosure Statement filed Jan. 18, 2006 in Application Ser. No. 90/007,591, 4 pp.

Non–Final Office Action in Ex Parte Reexamination dated Jan. 25, 2007 in Application Ser. No. 90/007,591, 29 pp.

Supplement Information Disclosure Statement filed May 16, 2006 in Application Ser. No. 90/007,591, 3 pp.

Ex Parte Reexamination Examiner Interview Summary Nov. 14, 2006 in Application Ser. No. 90/007,591, 4 pp.

Telephone Interview Summary Record filed Mar. 26, 2007 in Application Ser. No. 90/007,591, 4 pp.

Non–Final Office Action in Ex Parte Reexamination dated Apr. 5, 2007 in Application Ser. No. 90/007,591, 84 pp.

Non–Final Office Action in Ex Parte Reexamination dated Jul. 15, 2008 in Application Ser. No. 90/007,591, 12 pp.

Final Office Action in Ex Parte Reexamination dated Apr. 20, 2009 in Application Ser. No. 90/007,591, 12 pp.

Submission of Interview Summary Record as filed in U.S. Appl. No. 11/847,264, filed Aug. 17, 2009 in Application Ser. No. 90/007,591, 6 pp.

* cited by examiner

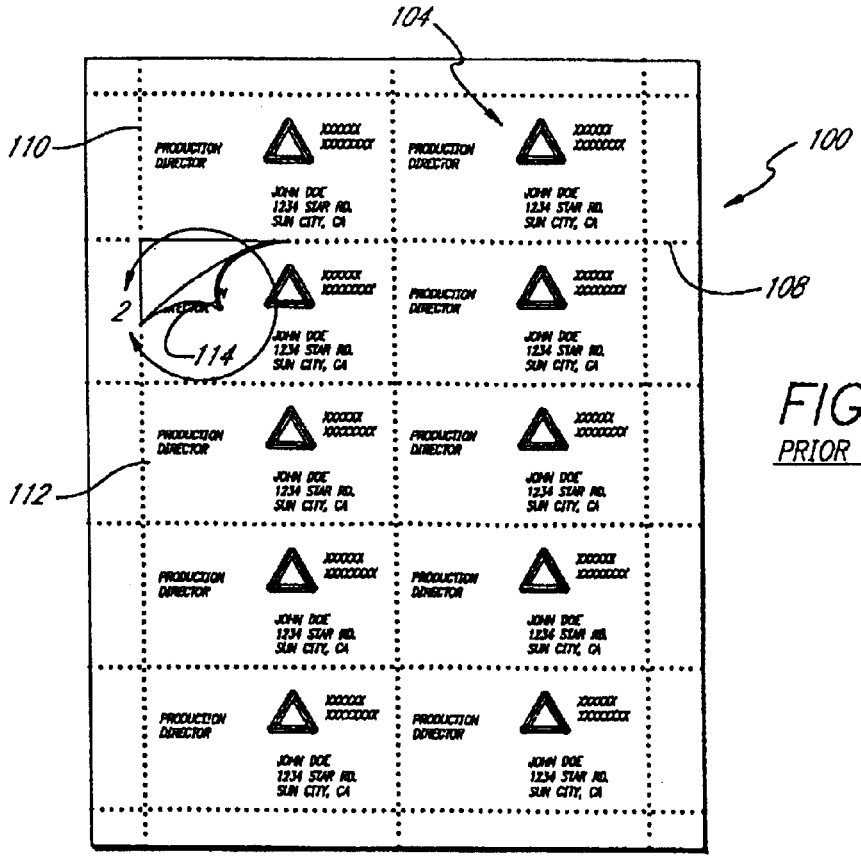
FIG. 1
PRIOR ART
FIG. 2
PRIOR ART
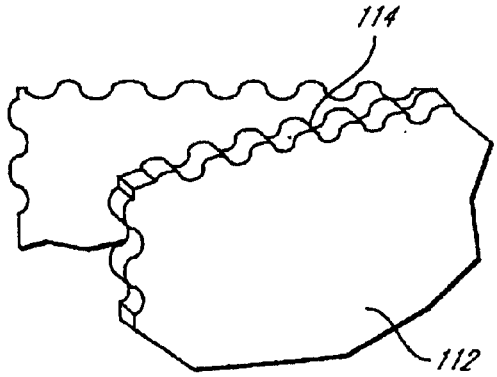
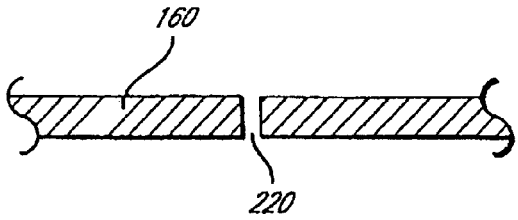
FIG. 5
FIG. 6
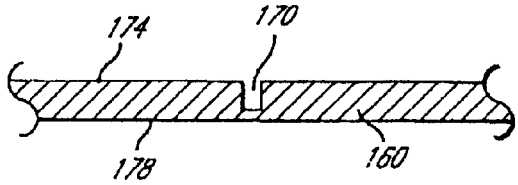

LASER OR INK JET PRINTABLE BUSINESS CARD SYSTEM

Matter enclosed in heavy brackets [ ] appears in the original patent but forms no part of this reissue specification; matter printed in italics indicates the additions made by reissue.

CROSS REFERENCE TO RELATED APPLICATION

This is a division of copending application Ser. No. 08/641,332, filed Apr. 30, 1996 *now U.S. Pat. No. 5,997,680* pending.

BACKGROUND OF THE INVENTION

The present invention relates to methods of forming business cards and to the constructions of sheets of blank business cards for passing through laser or ink jet printers or copiers.

A sheet of business cards as known in the prior art is shown in FIG. 1 generally at 100. Sheet 100 is a drawing of the sheet after having passed through a laser or ink jet printer and with the desired indicia shown generally at 104 printed thereon. Sheet 100 was formed with a gridwork of horizontal and vertical microperforation lines 108, 110 extending the full length and width of the sheet. The microperforations are typically more than fly per inch. Although the microperforations are thereby small and close together, when the cards 112, after the printing operation thereon, are separated from one another by tearing along the lines, perfectly clean cuts or edges do not result. Rather, the edges 114 are slightly fuzzy as shown in the enlarged view of FIG. 2. These fuzzy edges 114 give the card 112 a less professional look than clean knife cut edges and in certain uses are unacceptable.

SUMMARY OF THE INVENTION

Directed to remedying the problems of the prior art, disclosed herein is an improved business card sheet assembly. The assembly includes a card stock sheet having two parallel pairs of substantial-cut lines extending the length of the sheet and engaging the sheet at both ends thereof. The substantial-cut lines extend about 90% through the thickness of the sheet from the front towards the back surface. The sheet is then die cut with short (through-cut) lines extending widthwise between the lines of each pair. The substantial-cut and through-cut lines form on the sheet two columns of business card blanks, with paper waste strips at the side (and end) margins and between the columns. The sheet is then passed through a laser or ink jet printer and the desired indicia printed on each of the blanks. The printed card blanks are separated from one another along the substantial-cut and through-cut lines. The borders or edges of the card are clean, superior to the prior art microperforated cards.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a front view of a sheet of business cards of the prior art, after having been printed, and showing one of them being torn away along its microperforation lines;

FIG. 2 is an enlarged view taken on circle 2 of FIG. 1;

FIG. 5 is an enlarged view taken on line 5—5 of FIG. 4; and

FIG. 6 is an enlarged view taken on line 6—6 of FIG. 4.

DETAILED DESCRIPTION OF PREFERRED EMBODIMENTS OF THE INVENTION

Figure 3:
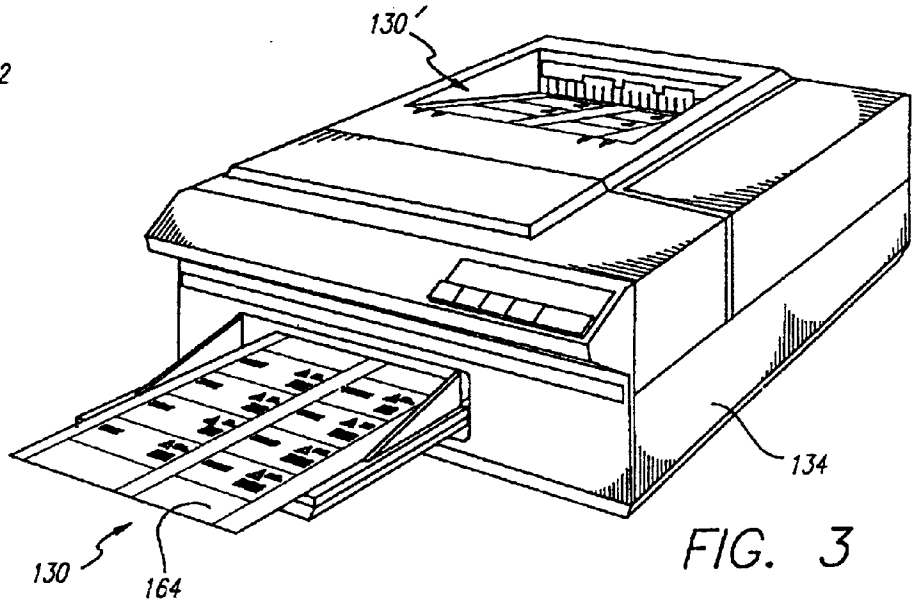
FIG. 3 is a perspective view showing sheet assemblies of the present invention passing through a printer.

Referring to FIGS. 3–6 a sheet assembly of the present invention is shown generally at 130. The sheet assembly 130 is shown at the bottom left of FIG. 3 before entering the printer 134 and as it would be purchased by the user (after removal from its packaging (not shown)). The sheet assembly 130' is shown in the upper right of FIG. 3 and (in isolation) in FIG. 4 after having passed through the printer 134, and with the identifying indicia shown generally at 140 printed thereon. As an example, the indicia 140 can include the individual's name 142, address 144, title 146, company name 148 and company logo 150. It can additionally or alternatively include other information such as telephone and facsimile numbers and/or E-mail addresses as desired. The printer 134 can be a laser or ink jet printer, or photocopier.

The sheet assembly includes a sheet of paper 160 such as the ten mil thick cardstock available from Simpson Paper Mill in Pomonoa, Calif. The thickness of the sheet of paper 160 is preferably between seven and twenty mils. A pattern of sheet portions or cards 164 are defined on the sheet by a pattern of lines. The sheet portions or cards 164 are preferably rectangular, but other shapes are within the scope of the invention. For example, the sheet 160 can be 8½×11 inches and each of the portions 164 can have the dimensions of a traditional business card (e.g., two by three and a half inches).

At least one of the defining lines is a "substantial-cut" or partial cut line 170, cut along its entire length, substantially but not all of the way through the paper 160; that is, cut from the top surface 174 of the paper approximately ninety percent the way through towards the bottom surface 178. This is shown in the enlarged view in FIG. 6. A preferred embodiment has the substantial-cut line(s) 170 extending 9.3 to 9.5 mil through a ten mil thick cardstock. Alternatively, they can extend between seventy and ninety-eight percent therethrough. The substantial-cut lines 170 can be formed by trimming wheels (rotary knives), by die cutting, laser [cutting] *scoring*, or chemical or acid etching.

Figure 4:
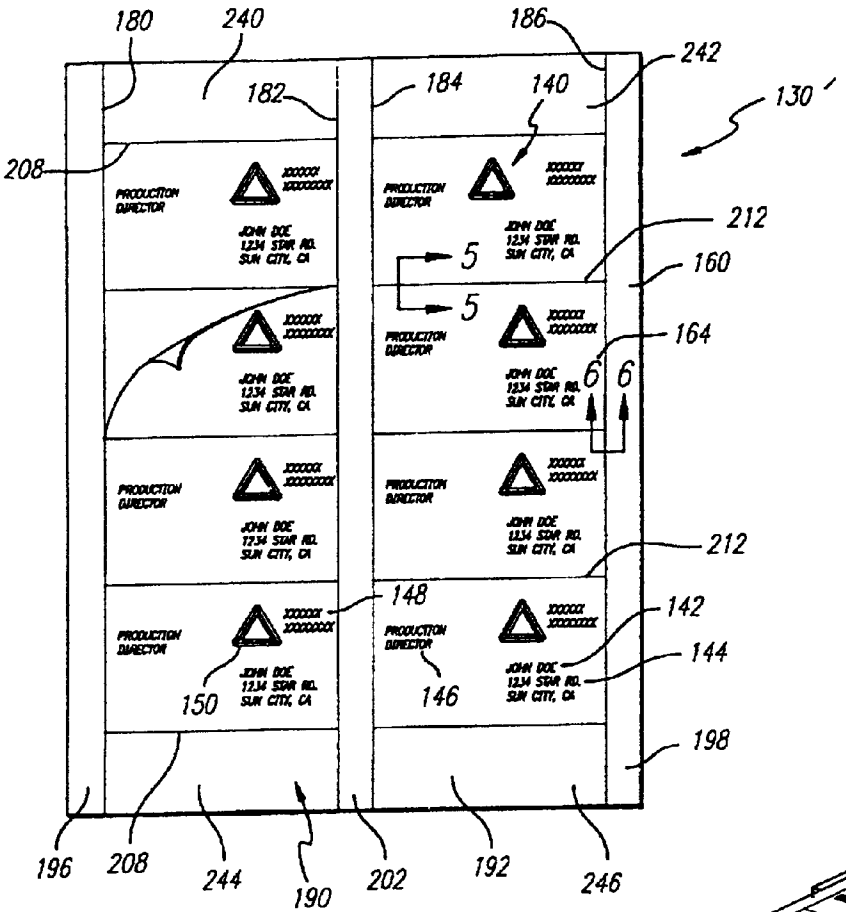
FIG. 4 is a front elevational view of one of the sheet assemblies of the present invention after a printing operation thereon.

A preferred pattern of defining lines is best shown in FIG. 4. It includes four parallel lengthwise lines 180, 182, 184, 186 extending the length of the sheet 160 and defining two parallel columns 190, 192 with waste strips 196, 198 at the outer edges and a center waste strip 202 between the columns. Spaced parallel widthwise lines 208, 212 extend the widths of the columns 190, 192, but not beyond them. As can be understood from FIG. 4, the lengthwise lines 180, 182, 184, 186 define the left and right edges of the sheet portions or cards 164 and the widthwise lines 208, 212 from the top and bottom edges thereof The lengthwise lines 180, 182, 184, 186 are each substantial-cut lines 170 as disclosed above. And the widthwise lines 208, 212 are preferably each through-cut lines formed by die cutting, as best shown in FIG. 5 at 220, extending the entire distance through the sheet 160 along their entire lengths; that is, between and engaging adjacent of the substantial-cut lengthwise lines. The through-cut lines 220 define a perfectly smooth edge and thus are preferred over microperforated or substantial-cut widthwise lines.

They also do not require any separating effort. None of the through-cut lines 220 engages any edge of the sheet 160. If they did, the sheet 160 would be likely to be torn along the line. The pattern of substantial-cut and full-cut lines still provides the card stock sheet 160 with sufficient integrity to reliably pass through the printer 134 without breaking apart.

After the sheet assembly 130 has passed through the printer 134 and the desired indicia 140 printed thereon, the individual cards (or printed media ) 164 are separated by tearing or pulling along the four substantial-cut lines. Of course, no further separation is required on the through-cut lines. The side and center waste strips 196, 198, 202 can then be disposed of, as can the end margin strips 240, 242, 244, 246 at the ends of both of the columns 190, 192.

From the foregoing detailed description, it will be evident that there are a number of changes, adaptations and modifications of the present invention which come within the province of those skilled in the art. For example, instead of paper the sheets can be laminated sheets, such as plastic and card stock, and instead of rectangular, the cards (or printed or printable media) can be triangular, circular or any other usable shape. However, it is intended that all such variations not departing from the spirit of the invention be considered as within the scope thereof as limited solely by the claims appended thereto.

What is claimed is:

[1. A sheet assembly for passing through a printer or copier and separating out into individual printed cards, comprising:

a sheet;

first and second substantial-cut lines extending substantially the thickness of said sheet and extending the length or width of said sheet; and parallel and spaced weakened separation lines extending perpendicular to and between said substantial-cut lines on said sheet;

wherein said separation lines and said substantial-cut lines define a column or row of card blanks; and wherein said sheet is adapted to be passed through a printer or copier and desired indicia printed on said card blanks, which can then be separated from one another along said separation lines and said substantial-cut lines.]

[2. The assembly of claim 1 wherein said sheet is a sheet of paper.]

[3. The assembly of claim 1 wherein said first and second substantial-cut lines are spaced parallel to one another.]

[4. The assembly of claim 3 wherein said substantial-cut lines extend the length of said sheet, and said separation lines and said substantial-cut lines define a column of card blanks.]

[5. The assembly of claim 4 wherein said separation lines comprises through-cut lines cut all of the way through said sheet and extending between and engaging at opposite ends thereof said first and second substantial-cut lines.]

[6. The assembly of claim 5 wherein end portions of said column of business card blanks engaging ends of said sheet define waste strips.]

[7. The assembly of claim 4 wherein said column of business card blanks defines a first column of business card blanks, and further comprising third and fourth substantial-cut lines in said sheet and additional separation lines extending therebetween and defining a second column of business card blanks, parallel to said first column.]

[8. The assembly of claim 7 further comprising a waste paper strip between said first and second columns and defined on opposite sides by said second and third substantial-cut lines.]

[9. The assembly of claim 4 wherein said sheet is 10 Mil thick cardstock.]

[10. The assembly of claim 9 wherein said substantial-cut lines are cut approximately 9.3 to 9.5 mils through said cardstock.]

[11. The assembly of claim 4 wherein said business card blanks comprise 2×3½ inch business card blanks, and said sheet is 8 ½×11 inches.]

[12. A sheet assembly for passing through a printer or copier and then separating out into at least one printed media, comprising:

a sheet;

at least one substantial-cut line extending substantially the thickness of said sheet; and at least one weakened separation line on said sheet;

wherein said separation line and said substantial-cut line together define at least a substantial portion of a perimeter of at least one printable media; and wherein said sheet is adapted to be passed through a printer or copier and desired indicia printed on said printable media, which can then be easily and cleanly separated from said sheet along said separation line and said substantial-cut line to form individual printed media.]

[13. The assembly of claim 12 (wherein said individual printed media comprise a printed rectangular business card.]

[14. The assembly of claim 12 wherein said separation line comprises an elongate through-cut line cut all of the way through said sheet.]

[15. The assembly of claim 12 wherein said at least one substantial-cut line comprises two parallel substantial-cut lines and said at least one separation line comprises two parallel through-cut lines.]

[16. The assembly of claim 15 wherein said through-cut lines extend perpendicular to, between and engaging at opposite ends thereof said substantial-cut lines.]

[17. The assembly of claim 16 wherein said printable media comprise a rectangular business card blank.]

[18. The assembly of claim,12 said substantial-cut line extends between 70 and 98 percent of the thickness of said sheet.]

[19. A sheet assembly for passing through a printer or copier and separating out into individual printed cards, comprising:

a sheet;

first and second scored lines extending substantially the thickness of said sheet and extending the length or width of said sheet; and parallel and spaced through-cut lines extending perpendicular to and between said score lines on said sheet;

wherein said through-cut lines and said scored lines define a column or row of card blanks; and wherein said sheet comprises a single-sheet construction which is adapted without losing its integrity to be passed: without further structure attached thereto through a printer or copier and desired indicia printed on said card blanks, which can then be separated from one another along said scored lines and said through-cut lines.]

[20. The assembly of claim 19 wherein said sheet is a sheet of paper.]

[21. The assembly of claim 19 said first and second scored lines are spaced parallel to one another.]

[22. The assembly of claim 21 wherein said scored lines extend the length of said sheet, and said through-cut lines and said scored lines define a column of card blanks.]

[23. The assembly of claim 22 wherein said through-cut lines extend between and engage at opposite ends thereof said first and second scored lines.]

[24. The assembly of claim 23 wherein end portions of said column of business card blanks engaging ends of said sheet define waste strips.]

[25. The assembly of claim 22 wherein said column of business card blanks defines a first column of business card blanks, and further comprising third and fourth scored lines in said sheet and additional through-cut lines extending therebetween and defining a second column of business card blanks, parallel to said first column.]

[26. The assembly of claim 25 further comprising a waste paper strip between said first and second columns and defined on opposite sides by said second and third scored lines.]

[27. The assembly of claim 22 wherein said sheet is 10 mil thick cardstock.]

[28. The assembly of claim 27 wherein said substantial-cut lines are cut approximately 9.3 to 9.5 mils through said cardstock.]

[29. The assembly of claim 22 wherein said business card blanks comprise 2×3 ½ inch business card blanks, and said sheet is 8 ½×11 inches.]

[30. A sheet assembly for passing through a printer or copier and then separating out into at least one printed media, comprising:

a sheet;

at least one scored line extending substantially the thickness of said sheet; and at least one elongate through-cut line on said sheet;

wherein said scored line and said through-cut line together define at least a portion of a perimeter of at least one printable media; and wherein said sheet comprises a single-sheet construction which is adapted without losing its integrity to be passed, without further structure attached thereto, through a printer or copier and desired indicia printed on said printable media, which can then be easily and cleanly separated from said sheet along said score line and said through-cut line to form individual printed media.]

[31. The assembly of claim 30 wherein said individual printed media comprise a printed rectangular business card.]

[32. The assembly of claim, 30 wherein said at least one scored line comprises two parallel scored lines and said at least one through-cut line comprises two parallel elongate through-cute lines.]

[33. The assembly of claim 32 wherein said through-cut lines extend perpendicular to, between and engaging at opposite ends thereof said score lines.]

[34. The assembly of claim 33 wherein said printable media comprises a rectangular business card blank.]

[35. The assembly of claim 30 wherein said score line extends between 70 and 98 percent of the thickness of said sheet.]

[36. A sheet assembly comprising:

a single-sheet construction printable sheet;

a plurality of separation lines formed on said sheet and dividing said sheet into a plurality of connected sheet portions; and at least some of said separation lines comprising substantial-cut lines extending through a substantial portion of a thickness of said sheet and thereby forming thin uncut intact sheet portions;

wherein said sheet is adapted to be passed through a printer or copier and desired indicia printed on said sheet portions; and wherein said thin uncut intact sheet portions collectively comprise the sole means for keeping said sheet portions together while said sheet is passed through the printer or copier to maintain the integrity of said sheet until said sheet portions are subsequently separated along said separation lines to form a plurality of individual printed media.]

[37. The sheet assembly of claim 36 wherein said separation lines comprise weakened separation lines.]

[38. The sheet assembly of claim wherein at least some of said weakened separation lines comprise through-cut lines.]

[39. The sheet assembly of claim 36 wherein said substantial-cut lines extend between approximately 70 and 98 percent the way through said sheet.]

[40. The sheet assembly of claim 36 wherein said substantial-cut lines extend approximately 90 percent the way through said sheet.]

[41. The sheet assembly of claim wherein said substantial-cut lines extend approximately 93 to 95 percent the way through said sheet.]

[42. The sheet assembly of claim 36 wherein the individual printed media comprise printed rectangular business cards.]

[43. The sheet assembly of claim 36 wherein said substantial-cut lines include first and second substantial-cut lines extending the length or width of said sheet.]

[44. The sheet assembly of claim wherein said plurality of separation lines include parallel and spaced weakened separation lines extending perpendicular to and between said first and second substantial-cut lines.]

[45. The sheet assembly of claim 44 wherein said weakened separation lines comprise through-cut lines.]

[46. The sheet assembly of claim 36 wherein said sheet comprises 10 mil thick cardstock.]

[47. The sheet assembly of claim 36 wherein said sheet comprises an approximately 8–12 mil thick media sheet.]

[48. The sheet assembly of claim 36 wherein said intact uncut portions engage a back side of said sheet.]

[49. The sheet assembly of claim 36 wherein said substantial cut-lines are all on only one face of said sheet.]

*50. A sheet assembly for passing through a printer or copier and separating out into individual printed cards, comprising:*

*a sheet having an exposed back surface;*

*first and second substantial-cut lines extending substantially the thickness of said sheet and extending a length or width of said sheet;*

*wherein said first substantial-cut line forms a thin uncut intact sheet portion adjacent to said first substantial-cut line;*

*wherein said thin uncut intact sheet portion includes a portion of said exposed back surface;*

*wherein said substantially the thickness is 70–98% of said thickness of said sheet; and*

*parallel and spaced weakened separation lines extending perpendicular to and between said substantial-cut lines on said sheet;*

*wherein said weakened separation lines and said substantial-cut lines define a column or row of card blanks;*

*wherein said sheet is adapted to be passed through a printer or copier and desired indicia printed on said*

*card blanks, which can then be separated from one another along said weakened separation lines and said substantial-cut lines and along and entirely through a thickness of said thin uncut intact sheet portion to said back surface;*

*wherein entire back surfaces of each of said card blanks are formed by said exposed back surface of said sheet;*

*wherein said thin uncut intact sheet portion extends continuously in an unbroken manner along an entire edge of one of said card blanks; and*

*wherein said substantial-cut lines are die-cut substantial-cut lines.*

*51. The assembly of claim 50 wherein said thin uncut intact sheet portion defines a first thin uncut intact sheet portion, said entire edge defines a first entire edge, said second substantial-cut line forms a second thin uncut intact sheet portion adjacent to said second substantial-cut line, wherein said sheet is adapted to be passed through the printer or copier and desired indicia printed on said card blanks, which can then be separated from one another along said weakened separation lines and said substantial-cut lines an along and entirely through thicknesses of said first and thin uncut intact sheet portions to said back surface; and wherein said second thin uncut intact sheet portion extends continuously in an unbroken manner along an entire second edge of said one of said card blanks.*

*52. The assembly of claim 50 wherein said sheet is a single layer construction.*

*53. The assembly of claim 50 wherein said sheet is a laminated construction.*

*54. The assembly of claim 50 wherein said sheet has an exposed front surface on which the desired indicia are printed.*

*55. The assembly of claim 50 wherein said substantial-cut lines extend between approximately 80 and 98 percent the way through said sheet.*

*56. The assembly of claim 50 wherein said sheet has a central body portion which includes all of said card blanks and said sheet has a waste frame portion surrounding said central body portion.*

*57. The assembly of claim 56 wherein said central body portion has a constant thickness throughout its extent except where substantial-cut lines and weakened separation lines are.*

*58. The assembly of claim 50 wherein said sheet includes a sheet of paper.*

*59. The assembly of claim 50 wherein said sheet is free of internal adhesive release surfaces.*

*60. The assembly of claim 50 wherein said card blanks abut one another.*

*61. The assembly of claim 50 wherein said card blanks include first and second card blanks, said first substantial-cut line defines an edge of said first card blank and said second substantial-cut line defines an edge of said second card blank which does not abut said edge of said first card blank.*

*62. The assembly of claim 50 wherein one of said card blanks can be separated from said sheet at least in part by tearing along said first substantial-cut line and along and entirely through the thickness of said thin uncut intact sheet portion.*

*63. The assembly of claim 50 wherein said sheet is free of weakened lines coinciding with either of said substantial-cut lines and penetrating said exposed back surface.*

*64. The assembly of claim 63 wherein said weakened lines are perforated lines.*

*65. A sheet assembly comprising:*

*a single-sheet construction printable sheet having an exposed back surface;*

*a plurality of separation lines formed on said sheet and dividing said sheet into a plurality of connected sheet portions; and*

*at least some of said separation lines comprising die-cut substantial-cut lines extending through a substantial portion of a thickness of said sheet and thereby forming thin uncut intact sheet portions;*

*wherein said thin uncut intact sheet portions each include a portion of said exposed back surface;*

*wherein said substantial portion of a thickness is 70–98% of said thickness of said sheet;*

*wherein said sheet is adapted to be passed through a printer or copier and desired indicia printed on said connected sheet portions;*

*wherein said thin uncut intact sheet portions collectively comprise the sole means for keeping said connected sheet portions together while said sheet is passed through the printer or copier to maintain the integrity of said sheet until said connected sheet portions are subsequently separated along said separation lines to form a plurality of individual printed media;*

*wherein entire back surfaces of said printed media are formed by said exposed back surface of said sheet; and*

*wherein said sheet has no weakened lines coinciding with said substantial-cut lines and penetrating said exposed back surface.*

*66. The assembly of claim 65 wherein said sheet is a single layer construction.*

*67. The assembly of claim 65 wherein said substantial-cut lines extend between approximately 80 and 98 percent the way through said sheet.*

*68. The assembly of claim 65 wherein said plurality of individual printed media are formed by separating along said separation lines and along and entirely through a thickness of each of said thin uncut intact sheet portions to said back surface.*

*69. The assembly of claim 65 wherein said thin uncut intact sheet portions extend continuously along a respective entire edge of one of said printed media, in an unbroken manner.*

*70. The assembly of claim 65 wherein said weakened lines are perforated lines.*

*71. The assembly of claim 65 wherein said sheet is free of internal adhesive release surfaces.*

*72. A sheet assembly for passing through a printer or copier and then separating out into at least one printed media, comprising:*

*a sheet having an exposed back surface;*

*at least one substantial-cut line extending substantially the thickness of said sheet and thereby forming an adjacent thin uncut intact sheet portion;*

*wherein said thin uncut intact sheet portion includes a portion of said exposed back surface;*

*wherein said substantially the thickness is 70–98% of the thickness of said sheet; and*

*at least one weakened separation line on said sheet;*

*wherein said weakened separation line and said substantial-cut line together define at least a substantial portion of a perimeter of at least one printable media;*

*wherein said sheet is adapted to be passed through a printer or copier and desired indicia printed on said*

*printable media, which can then be easily and cleanly separated from said sheet along said weakened separation line and said substantial-cut line and through said thin uncut intact sheet portion to said exposed back surface to form individual printed media;*

*wherein entire back surface of said printed media is formed by said exposed back surface of said sheet;*

*wherein said thin uncut intact sheet portion extends continuously in an unbroken manner along an entire edge of said printed media; and*

*wherein said at least one substantial-cut line comprises at least one die-cut substantial-cut line.*

*73. The assembly of claim 72 wherein said sheet is a single layer construction.*

*74. The assembly of claim 72 wherein said sheet is free of weakened lines on and penetrating said exposed back surface and coinciding with said at least one substantial-cut line.*

*75. The assembly of claim 72 wherein said sheet is a laminated construction.*

*76. The assembly of claim 72 wherein said sheet has an exposed front surface on which the desired indicia are printed.*

*77. The assembly of claim 72 wherein said at least one substantial-cut line extends between approximately 80 and 98 percent the way through said sheet.*

*78. The assembly of claim 72 wherein said at least one substantial-cut line comprises two parallel substantial-cut lines and said at least one weakened separation line comprises two parallel weakened separation lines.*

*79. The assembly of claim 72 wherein said sheet has a central body portion that includes all of said printable media and is surrounded by a waste frame portion of said sheet.*

*80. The assembly of claim 79 wherein said central body portion has a constant thickness throughout its extent except where substantial-cut lines and weakened separation lines are.*

*81. The assembly of claim 72 wherein said sheet includes a sheet of paper.*

*82. The assembly of claim 72 wherein said sheet has a substantially constant thickness except where substantial-cut lines and weakened separation lines are.*

*83. The assembly of claim 72 wherein said sheet is free of internal adhesive release surfaces.*

*84. The assembly of claim 72 wherein said at least one printable media includes a first printable media and said sheet includes a second printable media abutting said first printable media.*

*85. The assembly of claim 72 wherein said at least one printable media includes a first printable media, said sheet includes a second printable media, said at least one substantial-cut line includes first and second substantial-cut lines, said first substantial-cut line defines an edge of said first printable media and said second substantial-cut line defines an edge of said second printable media which does not abut said edge of said first printable media.*

*86. The assembly of claim 72 wherein said printable media can be separated from the rest of said sheet at least in part by tearing along said substantial-cut line and along and entirely through the thickness of said thin uncut intact print media portion to form said individual printed media.*

*87. A sheet assembly for passing through a printer or copier and then separating out into at least one printed media, comprising:*

*a sheet having an exposed back surface;*

*at least one substantial-cut line extending substantially the thickness of said sheet and thereby forming a thin uncut intact sheet portion;*

*wherein said thin uncut intact sheet portion includes a portion of said exposed back surface;*

*wherein said substantially the thickness is 70–98% of the thickness of said sheet; and*

*at least one weakened separation line on said sheet;*

*wherein said weakened separation line and said substantial-cut line together define at least a substantial portion of a perimeter of at least one printable media;*

*wherein said sheet is adapted to be passed through a printer or copier and desired indicia printed on said at least one printable media, which can then be easily and cleanly separated from said sheet along said weakened separation line and said substantial-cut line and through said thin uncut intact sheet portion to said exposed back surface to form individual printed media;*

*wherein said entire back surface of said printed media is formed by said exposed back surface of said sheet;*

*wherein said sheet is free of perforation lines coinciding with said at least one substantial-cut line; and*

*wherein said at least one substantial-cut line comprises at least one die-cut substantial-cut line.*

*88. The assembly of claim 87 wherein said sheet is a single layer construction.*

*89. The assembly of claim 87 wherein said sheet is a laminated construction.*

*90. The assembly of claim 87 wherein said sheet has an exposed front surface on which the desired indicia are printed.*

*91. The assembly of claim 87 wherein said at least one substantial-cut line extends between approximately 80 and 98 percent the way through said sheet.*

*92. The assembly of claim 87 wherein said at least one substantial-cut line comprises two parallel substantial-cut lines and said at least one weakened separation line comprises two parallel weakened separation lines.*

*93. The assembly of claim 87 wherein said sheet has a central body portion that includes all of said printable media and is surrounded by a waste frame portion of said sheet.*

*94. The assembly of claim 93 wherein said central body portion has a constant thickness throughout its extent except where substantial-cut lines and weakened separation lines are.*

*95. The assembly of claim 87 wherein said sheet includes a sheet of paper.*

*96. The assembly of claim 87 wherein said sheet has a substantially constant thickness except where substantial-cut lines and weakened separation lines are.*

*97. The assembly of claim 87 wherein said sheet is free of internal adhesive release surfaces.*

*98. The assembly of claim 87 wherein said at least one printable media includes a first printable media and said sheet includes a second printable media abutting said first printable media.*

*99. The assembly of claim 87 wherein said at least one printable media includes a first printable media, said sheet includes a second printable media, said at least one substantial-cut lines includes first and second substantial-cut lines, said first substantial-cut line defines an edge of said first printable media and said second substantial-cut line defines an edge of said second printable media which does not abut said edge of said first printable media.*

*100. The assembly of claim 87 wherein said printable media can be separated from the rest of said sheet at least in part by tearing along said substantial-cut line and along and*

*entirely through the thickness of said thin uncut intact print media portion to form said individual printed media.*

*101. A sheet assembly for passing through a printer or copier and separating out into individual printed cards, comprising:*

*a sheet having a back surface;*

*first and second substantial-cut lines extending substantially the thickness of said sheet and extending the length or width of said sheet; and*

*parallel and spaced weakened separation lines extending perpendicular to and between said substantial-cut lines on said sheet;*

*wherein said weakened separation lines and said substantial-cut lines define a column or row of card blanks;*

*wherein said sheet is adapted to be passed through a printer or copier and desired indicia printed on said card blanks, which can then be separated from one another along said weakened separation lines and said substantial-cut lines;*

*wherein said substantial-cut lines extend through a substantial portion of a thickness of said sheet and thereby form thin uncut intact sheet portions;*

*wherein one of said thin uncut intact sheet portions extends continuously in an unbroken manner along an entire edge of one of said card blanks;*

*wherein said substantial-cut lines are die-cut substantial-cut lines;*

*wherein said substantial-cut lines extend between approximately 70 and 98 percent the way through said sheet;*

*wherein the back surface of said sheet defines the entire back surfaces of all of said card blanks;*

*wherein said sheet has a substantially constant thickness except where substantial-cut lines and weakened separation lines are; and*

*wherein all of said card blanks have no cut lines on front faces thereof.*

*102. The assembly of claim 101 wherein said sheet includes a 10 mils thick sheet.*

*103. The assembly of claim 101 wherein said substantial-cut lines are cut approximately 93–95% through said sheet.*

*104. The assembly of claim 101 wherein said sheet has no perforation lines on an opposite side thereof and coinciding with said substantial-cut lines.*

*105. The assembly of claim 101 wherein said sheet is 10–20 mils thick.*

*106. The assembly of claim 101 wherein said substantial-cut lines extend approximately 90 percent the way through said sheet.*

*107. The assembly of claim 101 wherein said substantial-cut lines extend between approximately 93 and 95 percent the way through said sheet.*

*108. The assembly of claim 101 wherein said substantial-cut lines extend between approximately 80 and 98 percent the way through said sheet.*

*109. The assembly of claim 101 wherein said sheet is a single-layer printable sheet.*

*110. The assembly of claim 101 further comprising third and fourth substantial-cut lines on said sheet and parallel to said first and second substantial-cut lines, and parallel and spaced additional weakened separation lines extending perpendicular to and between said third and fourth substantial-cut lines, and wherein said column or row defines a first column of card blanks, and said third and fourth substantial-cut lines and said additional weakened separation lines define a second column of card blanks parallel to said first column of card blanks.*

*111. The assembly of claim 101 wherein said sheet comprises an approximately 8–12 mil thick media sheet.*

*112. The assembly of claim 101 wherein the printer or copier is an ink jet printer or a laser printer.*

*113. The assembly of claim 101 wherein said substantial-cut lines are both on the same face of said sheet.*

*114. The assembly of claim 101 wherein at least one of said weakened separation lines comprises a through-cut line.*

*115. The assembly of claim 101 wherein said sheet has no weakened lines on and penetrating an opposite side thereof coinciding with said substantial-cut lines.*

*116. The assembly of claim 101 wherein said sheet is free of internal adhesive release surfaces.*

*117. A sheet assembly for passing through a printer or copier and then separating out into at least one printed media, comprising:*

*a sheet;*

*at least one substantial-cut line extending substantially the thickness of said sheet; and*

*at least one weakened separation line on said sheet;*

*wherein said weakened separation line and said substantial-cut line together define at least a substantial portion of a perimeter of at least one printable media;*

*wherein said sheet is adapted to be passed through a printer or copier and desired indicia printed on said printable media, which can then be easily and cleanly separated from said sheet along said weakened separation line and said substantial-cut line to form individual printed media;*

*wherein said at least one substantial-cut line extends through a substantial portion of a thickness of said sheet and thereby forms at least one thin uncut intact sheet portion;*

*wherein one of said at least one thin uncut intact sheet portion extends continuously in an unbroken manner along an entire edge of one of said printable media;*

*wherein said at least one substantial-cut line is at least one die-cut substantial-cut line;*

*wherein said at least one substantial-cut line extends between approximately 70 and 98 percent the way through said sheet; and*

*wherein said sheet has no internal release surface.*

*118. The assembly of claim 117 wherein said at least one substantial-cut line comprises two parallel substantial-cut lines, said at least one weakened separation line comprises two parallel through-cut lines, and said through-cut lines extend perpendicular to, between and engaging at opposite ends thereof said substantial-cut lines.*

*119. The assembly of claim 117 wherein all of said thin uncut intact sheet portions engage a same face of said sheet.*

*120. The assembly of claim 117 wherein said sheet has no perforation lines on an opposite side thereof and coinciding with said at least one substantial-cut line.*

*121. The assembly of claim 117 wherein said at least one substantial-cut line extends approximately 90 percent the way through said sheet.*

*122. The assembly of claim 117 wherein said at least one substantial-cut line extends between approximately 93 and 95 percent the way through said sheet.*

*123. The assembly of claim 117 wherein said at least one substantial-cut line extends between approximately 80 and 98 percent the way through said sheet.*

*124. The assembly of claim 117 wherein said sheet comprises a 10–20 mil thick sheet.*

*125. The assembly of claim 117 wherein said at least one substantial-cut line includes first and second substantial-cut lines extending continuously the length or width of said sheet, and wherein said at least one weakened separation line includes parallel and spaced weakened separation lines extending perpendicular to and between said first and second substantial-cut lines.*

*126. The assembly of claim 117 wherein said sheet comprises 10 mils thick cardstock.*

*127. The assembly of claim 117 wherein said sheet comprises an approximately 8–12 mil thick media sheet.*

*128. The assembly of claim 117 wherein the printer or copier is an ink jet printer or a laser printer.*

*129. The assembly of claim 117 wherein said at least one weakened separation line comprises a through-cut line.*

*130. The assembly of claim 117 wherein said sheet has no perforation lines on an opposite side thereof coinciding with said at least one substantial cut-line.*

*131. A sheet assembly comprising:*

*a single-sheet construction printable sheet;*

*a plurality of separation lines formed on said sheet and dividing said sheet into a plurality of connected sheet portions; and*

*at least some of said separation lines comprising substantial-cut lines extending through a substantial portion of a thickness of said sheet and thereby forming thin uncut intact sheet portions;*

*wherein said sheet is adapted to be passed through a printer or copier and desired indicia printed on said connected sheet portions;*

*wherein said thin uncut intact sheet portions collectively comprise the sole means for keeping said connected sheet portions together while said sheet is passed through the printer or copier to maintain the integrity of said sheet until said connected sheet portions are subsequently separated along said separation lines to form a plurality of individual printed media;*

*wherein one of said thin uncut intact sheet portions extends continuously in an unbroken manner along an entire edge of one of said connected sheet portions and is constructed, dimensioned and structurally capable of forming a sheet portion clean edge when said one of said connected sheet portions is manually separated through and along said one of said thin uncut intact sheet portions;*

*wherein said substantial-cut lines are die-cut substantial-cut lines;*

*wherein said substantial-cut lines extend between approximately 70 and 98 percent the way through said sheet; and*

*wherein said sheet has a substantially constant thickness except where substantial-cut lines and separation lines are.*

*132. The sheet assembly of claim 131 wherein at least some of said separation lines comprise through-cut lines.*

*133. The sheet assembly of claim 131 wherein said substantial-cut lines extend approximately 90 percent the way through said sheet.*

*134. The sheet assembly of claim 131 wherein said substantial-cut lines extend approximately 93 to 95 percent the way through said sheet.*

*135. The sheet assembly of claim 131 wherein said sheet comprises 10 mils thick cardstock.*

*136. The sheet assembly of claim 131 wherein said sheet comprises an approximately 8–12 mil thick media sheet.*

*137. The sheet assembly of claim 131 wherein all of said substantial cut-lines are on only one face of said sheet.*

*138. The sheet assembly of claim 131 wherein all of said thin uncut intact sheet portions engage a same face of said sheet.*

*139. The sheet assembly of claim 131 wherein said sheet has no perforation lines on an opposite side thereof and coinciding with said substantial-cut lines.*

*140. The sheet assembly of claim 131 wherein said substantial-cut lines extend between approximately 80 and 98 percent the way through said sheet.*

*141. The sheet assembly of claim 131 wherein said sheet comprises a 10–20 mils thick sheet.*

*142. The sheet assembly of claim 131 wherein said sheet is a single-layer printable sheet.*

*143. The sheet assembly of claim 131 wherein some of said separation lines include parallel and spaced weakened separation lines extending perpendicular to and between first and second of said substantial-cut lines.*

*144. The sheet assembly of claim 143 wherein said substantial-cut lines further include third and fourth substantial-cut lines parallel to said first and second substantial-cut lines, and said plurality of separation lines further includes parallel and spaced additional weakened separation lines extending perpendicular to and between said third and fourth substantial-cut lines.*

*145. The sheet assembly of claim 131 wherein the printer or copier is an ink jet printer or a laser printer.*

*146. The sheet assembly of claim 131 wherein said sheet has no perforation lines on an opposite side thereof coinciding with said substantial cut-lines.*

*147. The sheet assembly of claim 131 wherein said sheet is free of internal adhesive release surfaces.*

*148. A sheet assembly comprising:*

*a single-sheet construction printable sheet;*

*a plurality of separation lines formed on said sheet and dividing said sheet into a plurality of connected sheet portions; and*

*at least some of said separation lines comprising substantial-cut lines extending through a substantial portion of a thickness of said sheet and thereby forming thin uncut intact sheet portions;*

*wherein said sheet is adapted to be passed through a printer or copier and desired indicia printed on said connected sheet portions;*

*wherein said thin uncut intact sheet portions collectively comprise the sole means for keeping said connected sheet portions together while said sheet is passed through the printer or copier to maintain the integrity of said sheet until said connected sheet portions are subsequently separated along said separation lines to form a plurality of individual printed media;*

*wherein one of said thin uncut intact sheet portions extends continuously in an unbroken manner along an entire edge of one of said connected sheet portions;*

*wherein said substantial-cut lines are die-cut substantial-cut lines;*

*wherein said substantial-cut lines extend between approximately 70 and 98 percent the way through said sheet;*

*wherein the back surface of said sheet defines the entire back surfaces of all of said connected sheet portions;*

*wherein said sheet has a substantially constant thickness except where substantial-cut lines and separation lines are; and*

*wherein all of said connected sheet portions have no cut lines on front faces thereof.*

*149. The sheet assembly of claim 148 wherein at least some of said separation lines comprise through-cut lines.*

*150. The sheet assembly of claim 148 wherein said substantial-cut lines extend approximately 90 percent the way through said sheet.*

*151. The sheet assembly of claim 148 wherein said substantial-cut lines extend approximately 93 to 95 percent the way through said sheet.*

*152. The sheet assembly of claim 148 wherein said sheet comprises 10 mils thick cardstock.*

*153. The sheet assembly of claim 148 wherein said sheet comprises an approximately 8–12 mil thick media sheet.*

*154. The sheet assembly of claim 148 wherein all of said substantial cut-lines are on only one face of said sheet.*

*155. The sheet assembly of claim 148 wherein all of said thin uncut intact sheet portions engage a same face of said sheet.*

*156. The sheet assembly of claim 148 wherein sheet has no perforation lines on an opposite side thereof and coinciding with said substantial-cut lines.*

*157. The sheet assembly of claim 148 wherein said substantial-cut lines extend between approximately 80 and 98 percent the way through said sheet.*

*158. The sheet assembly of claim 148 wherein said sheet comprises a 10–20 mil thick sheet.*

*159. The sheet assembly of claim 148 wherein the printer or copier is an ink jet printer or a laser printer.*

*160. The sheet assembly of claim 148 wherein said sheet has no perforation lines on an opposite side thereof coinciding with said substantial cut-lines.*

*161. The sheet assembly of claim 148 wherein said sheet is free of internal adhesive release surfaces.*

*162. A sheet assembly for passing through a printer or copier and then separating out into at least one printed media, comprising:*

*a sheet;*

*at least one substantial-cut line extending substantially the thickness of said sheet; and*

*at least one weakened separation line on said sheet;*

*wherein said weakened separation line and said substantial-cut line together define at least a substantial portion of a perimeter of at least one printable media;*

*wherein said sheet is adapted to be passed through a printer or copier and desired indicia printed on said at least one printable media, which can then be easily and cleanly separated from said sheet along said weakened separation line and said substantial-cut line to form at least one individual printed media;*

*wherein said sheet has no perforation lines on an opposite side thereof coinciding with said at least one substantial-cut line;*

*wherein said at least one substantial-cut line is at least one die cut substantial-cut line;*

*wherein said at least one substantial-cut line extends between approximately 70 and 98 percent the way through said sheet;*

*wherein the back surface of said sheet defines the entire back surfaces of all of said at least one printable media;*

*wherein said sheet has a substantially constant thickness except where substantial-cut lines and weakened separation lines are; and*

*wherein said at least one printable media has no cut lines on a front face thereof.*

*163. The assembly of claim 162 wherein said at least one substantial-cut line extends approximately 90 percent the way through said sheet.*

*164. The assembly of claim 162 wherein said at least one substantial-cut line extends between approximately 93 and 95 percent the way through said sheet.*

*165. The assembly of claim 162 wherein said at least one substantial-cut line extends between approximately 80 and 98 percent the way through said sheet.*

*166. The assembly of claim 162 wherein said sheet comprises a 10–20 mil thick sheet.*

*167. The assembly of claim 162 wherein said sheet is a single-layer printable sheet.*

*168. The assembly of claim 162 wherein said sheet is a 10 mils thick sheet.*

*169. The assembly of claim 162 wherein said sheet comprises an approximately 8–12 mil thick sheet.*

*170. The assembly of claim 162 wherein the printer or copier is an ink jet printer or a laser printer.*

*171. The assembly of claim 162 wherein said at least one weakened separation line comprises a through-cut line.*

*172. The assembly of claim 162 wherein said sheet is free of internal adhesive release surfaces.*

*173. A sheet assembly for passing through a printer or copier and separating out into individual printed cards, comprising:*

*a sheet;*

*first and second substantial-cut lines extending substantially the thickness of said sheet and extending a length or width of said sheet; and*

*parallel and spaced weakened separation lines extending perpendicular to and between said substantial-cut lines on said sheet;*

*wherein said weakened separation lines and said substantial-cut lines define a column or row of card blanks;*

*wherein said sheet is adapted to be passed through a printer or copier and desired indicia printed on said card blanks, which can then be separated from one another along said weakened separation lines and said substantial-cut lines;*

*wherein said sheet has no weakened lines on and penetrating an opposite side thereof and coinciding with said substantial-cut lines;*

*wherein said sheet is constructed, dimensioned and structurally capable of forming a card blank clean edge when said one of said card blanks is manually separated through and along said one of said thin uncut intact sheet portions;*

*wherein said substantial-cut lines are die-cut substantial-cut lines;*

*wherein said substantial-cut lines extend between approximately 70 and 98 percent the way through said sheet; and*

*wherein said sheet has a substantially constant thickness except where substantial-cut lines and weakened separation lines are.*

*174. The assembly of claim 173 wherein said sheet includes a sheet of paper.*

*175. The assembly of claim 173 wherein said sheet is a 10 mils thick sheet.*

*176. The assembly of claim 173 wherein said substantial-cut lines extend approximately 90 percent the way through said sheet.*

*177. The assembly of claim 173 wherein said substantial-cut lines extend between approximately 93 and 95 percent the way through said sheet.*

*178. The assembly of claim 173 wherein said substantial-cut lines extend between approximately 80 and 98 percent the way through said sheet.*

*179. The assembly of claim 173 wherein said sheet comprises a 10–20 mil thick sheet.*

*180. The assembly of claim 173 wherein said sheet is a single-layer printable sheet.*

*181. The assembly of claim 173 wherein said weakened separation lines comprise through-cut lines.*

*182. The assembly of claim 173 further comprising third and fourth substantial-cut lines on said sheet and parallel to said first and second substantial-cut lines, and parallel and spaced additional weakened separation lines extending perpendicular to and between said third and fourth substantial-cut lines.*

*183. The assembly of claim 173 wherein said sheet comprises an approximately 8–12 mil thick media sheet.*

*184. The assembly of claim 173 wherein the printer or copier is an ink jet printer or a laser printer.*

*185. The assembly of claim 173 wherein said substantial-cut lines are both on the same face of said sheet.*

*186. The assembly of claim 173 wherein said weakened line is a perforated line.*

*187. The assembly of claim 173 wherein said sheet is free of internal adhesive release surfaces.*

* * * * *